United States Patent
Benosman et al.

(10) Patent No.: US 12,038,727 B2
(45) Date of Patent: Jul. 16, 2024

(54) SYSTEM FOR PERFORMING A TASK ACCORDING TO A REFERENCE TRAJECTORY

(71) Applicant: Mitsubishi Electric Research Laboratories, Inc., Cambridge, MA (US)

(72) Inventors: Mouhacine Benosman, Boston, MA (US); Devesh Jha, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 777 days.

(21) Appl. No.: 17/215,582

(22) Filed: Mar. 29, 2021

(65) Prior Publication Data

US 2022/0308530 A1    Sep. 29, 2022

(51) Int. Cl.
G05B 13/02       (2006.01)
G05B 13/04       (2006.01)
G06N 20/00       (2019.01)

(52) U.S. Cl.
CPC ........ G05B 13/029 (2013.01); G05B 13/042 (2013.01); G06N 20/00 (2019.01)

(58) Field of Classification Search
CPC . G05B 13/029; G05B 13/0265; G05B 13/042
See application file for complete search history.

(56) References Cited

U.S. PATENT DOCUMENTS

| | | | | |
|---|---|---|---|---|
| 11,698,625 | B2 * | 7/2023 | Berntorp | G05D 1/0088 700/49 |
| 2006/0116783 | A1 * | 6/2006 | Aghili | G05B 13/042 700/29 |
| 2007/0073442 | A1 * | 3/2007 | Aghili | B25J 9/1605 700/245 |
| 2016/0147203 | A1 * | 5/2016 | Di Cairano | G05B 13/042 700/30 |
| 2019/0384237 | A1 * | 12/2019 | Wang | G05B 13/042 |
| 2021/0264078 | A1 * | 8/2021 | Cheng | G06N 5/01 |
| 2023/0288886 | A1 * | 9/2023 | Berntorp | G05B 13/045 |
| 2024/0069508 | A1 * | 2/2024 | Menner | G05B 13/048 |

* cited by examiner

*Primary Examiner* — Mohammad Ali
*Assistant Examiner* — Vincent W Chang
(74) *Attorney, Agent, or Firm* — Gene Vinokur; Hironori Tsukamoto

(57) ABSTRACT

A system for performing a task according to a reference trajectory is provided. The system includes at least one actuator configured to change a state of the system according to a control input, and a memory configured to store a model of dynamics of the system including a known part of the dynamics of the system as a function of the state of the system and the control input to the system and an unknown part of the dynamics of the system as a function of the state of the system, wherein the unknown part of the dynamics of the system is represented by parameters of a probabilistic distribution including a first-order moment and a second-order moment of the probabilistic distribution. The system also includes a control system configured to recursively determine and submit the control input to the actuator to change the state of the system.

11 Claims, 10 Drawing Sheets

- Initialize: $I = 1$, $x(0) \in X$, $t^*$.
- Apply the robust controller obtained by (2), (8), (9), and (13).
- (Loop) – Evaluate the GP uncertainty approximation.
  - IF GP estimation converges → Exit Loop, IF not
  - $I = I+1$.
  - Improve the GP uncertainty approximation.
  - Reset $t \in [(I-1)t^*, t^*]$, $x((I-1)t^*) = x_0$, then, apply the controller (2), (8), (9), and (13).
  - Go to (Loop).

FIG. 3B

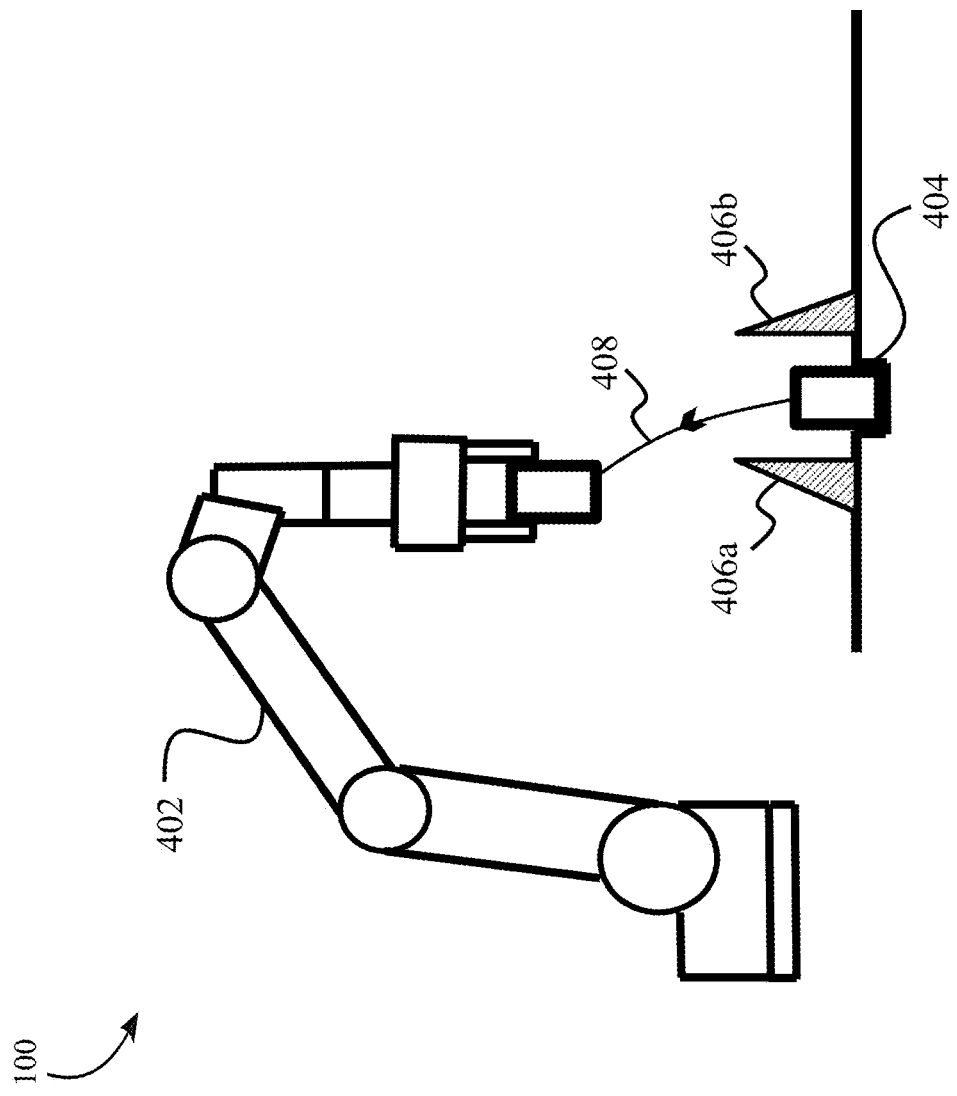

SYSTEM FOR PERFORMING A TASK ACCORDING TO A REFERENCE TRAJECTORY

TECHNICAL FIELD

The present disclosure relates generally to controlling of a system and more particularly to a system for performing a task according to a reference trajectory.

BACKGROUND

In controlling of a system, a controller, which can be implemented using one or combination of software or hardware, generates control commands to the system. The control commands direct an operation of the system as desired, for instance, the operation follows a desired reference profile, or regulates outputs to a specific value. However, many real-world systems, such as autonomous vehicles and robotics, are required to satisfy constraints upon deployment to ensure safe operation. Further, the real-world systems are often subject to effects such as non-stationarity, wear-and-tear, uncalibrated sensors and the like. Such effects cause uncertainties in dynamics of the system. Due to the uncertainties in the dynamics of the system, learning of a model of the system becomes difficult. Further, due to the uncertainties in the dynamics of the system, it is difficult to design a controller that provides a stable control of the system. Furthermore, uncertainties may exist in an environment, where the system is operating. Such uncertanties adversely effects the controlling of the system.

Some approaches use reinforcement learning (RL) algorithms to design a controller for controlling the operation of the system based on the desired reference profile. However, the RL algorithms do not guarantee successful operation of the system, in presence of the uncertainties in dynamics of the system. For instance, the controller may track the desired reference profile with high tracking error.

SUMMARY

It is an object of some embodiments to provide a system for performing a task according to a reference trajectory. Additionally, it is an object of some embodiments to design a controller that tracks the reference trajectory with a decaying bounded error, despite uncertainty in dynamics of the system. Additionally or alternatively, it is an object of some embodiments to design a controller that allows iterative learning of the uncertainty in real time, while maintaining boundedness of the tracking error during the learning. The system may be a drone, an autonomous vehicle, a robot, or a train. The task performed by the system includes changing a state of the system from a start state to an end state. For example, if the system is the robot, the task includes changing a current angular value of a joint of a robotic arm to a target angular value for performing an assembly operation, e.g., insert an object into another object, along the reference trajectory. In this example, the reference trajectory may correspond to a path defining a motion of an end tool of the robotic arm, for performing the assembly operation.

In control theory, robust control is an approach to design the controller that explicitly deals with the uncertainty. Robust control methods are designed to function properly, provided that uncertain parameters or disturbances are within some (typically compact) set. The robust control methods aim to achieve robust performance and/or stability in presence of bounded modeling errors. However, the robust control is typically designed for a worst-case scenario, and thus, suboptimal. Besides, the uncertainties encoded by the robust control are intermingled with other parts of the robust control and are difficult to update.

Some embodiments are based on the realization that a compound control objective of a robust control of the system can be separated into different control objectives. This allows creating different controllers devoted to a single or at least simplified control objective, such that total control of the system is performed cooperatively by the individual controllers. For example, it is an object of some embodiments to provide a controller that (a) tracks the reference trajectory with the decaying bounded tracking error, despite the uncertainty; and (b) learns the uncertainty, while maintaining boundedness of the tracking error during the learning. Some embodiments are based on the recognition that such objectives can be implemented by different controllers cooperatively working together.

Some embodiments are based on recognition that the dynamics of the system of the control can be partitioned into two parts, i.e., a known part and an unknown part. Some embodiments are based on the realization that while the known part of the dynamics of the system is a function of the state of the system and a control input to the system, the unknown part of the dynamics of the system can be represented as a function of only the state of the system, i.e., without parameterizing the function on the control input.

The unknown part of the dynamics of the system may represent parts of the dynamics of the system that are not modeled correctly. For example, the unknown part of the dynamics of the system may represent external forces acting on the system for a given period of time, while the external forces are explicitly included in the model of dynamics of the system. The external forces include, for instance, impulse forces acting on the system due to contact dynamics with an external object. Alternatively or additionally, the unknown part of the dynamics of the system may represent model mismatches due to errors in physical parameters of the system, e.g., a mass value discrepancy, or a friction value discrepancy.

Some embodiments are based on realization that separation of the known part of the dynamics of the system and the unknown part of the dynamics of the system allows designing a tracking controller with a consideration that the unknown part does not exist. Such a design makes the tracking controller independent of the unknown part of the dynamics, which allows optimizing the tracking controller for the known part of the dynamics of the system. In an embodiment, the tracking controller can be designed as a combination of a feedforward controller and a feedback controller.

The feedforward controller is designed based on the known part of the dynamics of the system. The feedforward controller is configured to generate a feedforward control input causing the state of the system to track the reference trajectory with a tracking error. The feedback controller is designed based on the known part of the dynamics of the system. The feedback controller is configured to generate a feedback control input causing the state of the system to reduce the tracking error. The separation of the tracking controller into the feedforward and the feedback controller allows use of different optimization techniques for different controllers and allows updating each controller differently and/or asynchronously.

However, ignoring the unknown part of the dynamics can make the controlling of the system, based only on the known part of the dynamics of the system, unstable. To that end, some embodiments employ a robust controller whose objective is to stabilize the states of the system along the reference trajectory, which in turn results in a stable control of the system. As the robust controller does not have to track the reference trajectory, design of the robust controller is simplified. For example, the control system is configured to determine a bound on the unknown part of the dynamics of the system. Further, the robust controller is designed based on the bound. While the bound is determined for the unknown part of the dynamics of the system, the unknown part itself is not considered directly in the design of the robust controller, which simplifies the design and update of the robust controller.

The robust controller is configured to generate a robust control input that stabilizes the control of the system, where the unknown part of the dynamics of the system is within the bound. A combiner is configured to generate the control input to an actuator of the system based on a combination of the feedforward control input, the feedback control input, and the robust control input. The actuator changes the state of the system based on the control input to perform the task according to the reference trajectory. To that end, the combination of the tracking controller and the robust controller constitutes a full controller that tracks the reference trajectory with the decaying bounded tracking error, despite the uncertainty in the dynamics of the system.

Some embodiments are based on recognition that, as the control of the system is stable due to the different controllers (such as tracking controller and the robust controller), it is safe to use various learning methods to recursively learn the unknown part of the dynamics of the system. For example, some embodiments learn the unknown part statistically from the corresponding pairs of control inputs and outputs of the system. Due to the statistical nature of learning the unknown part of dynamics, some embodiments represent the unknown part of the dynamics of the system by parameters of a probabilistic distribution including a first-order moment and a second-order moment of the probabilistic distribution, and update the parameters of the probabilistic distribution based on the corresponding pairs of control inputs and outputs of the system in data-driven and model-free manner.

In an embodiment, the probabilistic distribution is a Gaussian distribution, such that the first-order moment is a mean of the Gaussian distribution and the second-order moment is a variance of the Gaussian distribution. According to some embodiments, the parameters of the probabilistic distribution of the unknown part of the dynamics are updated using a data-driven and model-free method including one or a combination of a Gaussian process, a reinforcement learning, and a deep neural network.

Accordingly, one embodiment discloses a system for performing a task according to a reference trajectory. The system comprises at least one actuator configured to change a state of the system according to a control input, at least one sensor configured to measure an output of the system caused by the control input, and a memory configured to store a model of dynamics of the system including a known part of the dynamics of the system as a function of the state of the system and the control input to the system and an unknown part of the dynamics of the system as a function of the state of the system, wherein the unknown part of the dynamics of the system is represented by parameters of a probabilistic distribution including a first-order moment and a second-order moment of the probabilistic distribution. The system further comprises a control system configured to recursively determine and submit the control input to the actuator to change the state of the system. The control system includes a processor coupled with stored instructions forming modules of the control system executed by the processor, the modules comprising: a feedforward controller designed based on the known part of the dynamics of the system to generate a feedforward control input causing the state of the system to track the reference trajectory with a tracking error; a feedback controller designed based on the known part of the dynamics of the system to generate a feedback control input causing the state of the system to reduce the tracking error; a robust controller designed based on a bound on uncertainty of the unknown part of the dynamics of the system to generate a robust control input stabilizing control of the system having the uncertainty in its dynamics limited by the bound; a combiner configured to generate the control input to the actuator of the system based on a combination of the feedforward control input, the feedback control input, and the robust control input; and a learning module configured to (1) update the parameters of the probabilistic distribution of the unknown part of the dynamics based on corresponding pairs of control inputs and outputs of the system; (2) update the known part of the dynamics based on a first-order moment of the updated probabilistic distribution; (3) update the feedback controller based on the updated known part of the dynamics of the system; (4) update the bound based on a second-order moment of the updated probabilistic distribution; and (5) update the robust controller based on the updated bound.

BRIEF DESCRIPTION OF THE DRAWINGS

FIG. 3B shows a learning-based control algorithm for updating an uncertain part of the dynamics of the system, according to some embodiments.

FIG. 4 illustrates the system performing a task based on the reference trajectory, according to some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
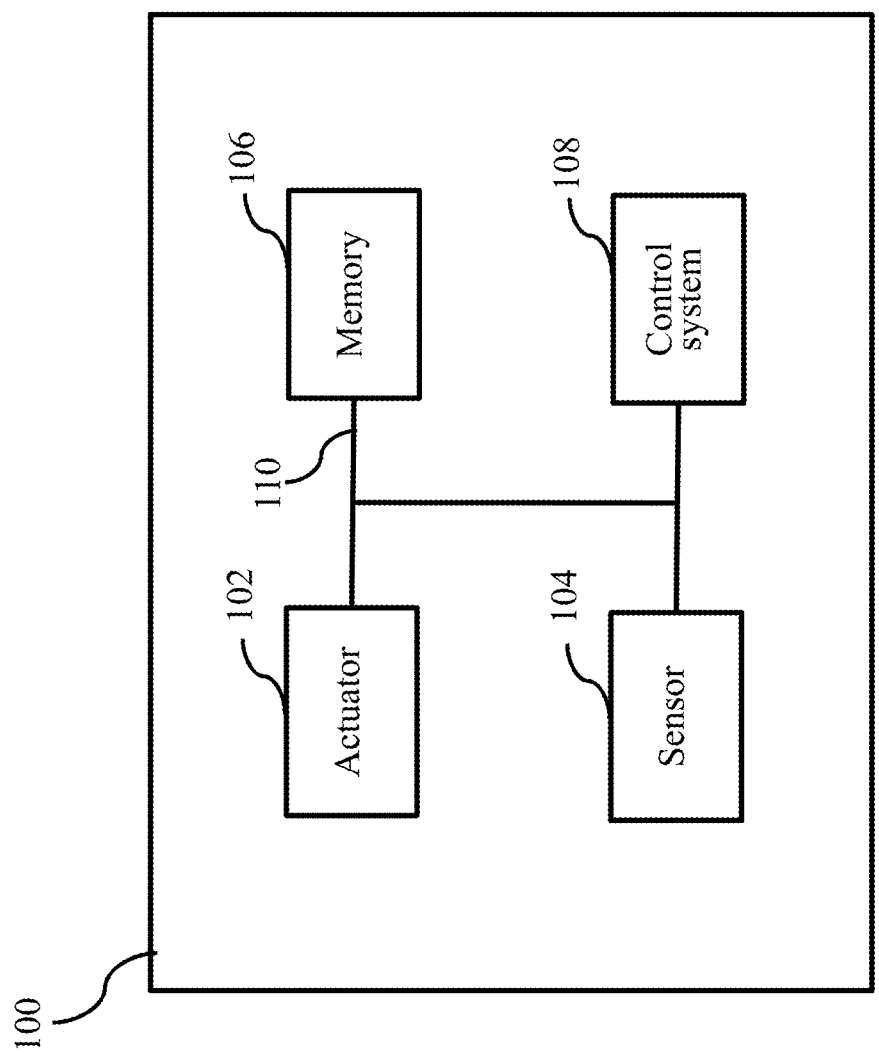
FIG. 1A shows a block diagram of a system for performing a task according to a reference trajectory, according to some embodiments.

FIG. 1A shows a block diagram of a system 100 for performing a task according to a reference trajectory, according to some embodiments. The system 100 may be a drone, an autonomous vehicle, a robot, or a train. The task performed by the system 100 includes changing a state of the system 100 from a start state to an end state. For example, if the system 100 is the robot, the task includes changing a current angular value of a joint of a robotic arm to a target angular value for performing an assembly operation, e.g., insert an object into another object, along the reference trajectory. In this example, the reference trajectory may correspond to a path defining a motion of an end tool of the robotic arm, for performing the assembly operation.

The system 100 includes an actuator 102, a sensor 104, a memory 106, and a control system 108. The actuator 102, the sensor 104, the memory 106, and the control system 108 are connected with each other through a bus 110. In an alternate embodiment, the system 100 may include a plurality of actuators and a plurality of sensors. The actuator 102 is configured to change the state of the system 100 according to a control input. The sensor 104 is configured to measure an output of the system 100 caused by the control input. In case of the robot example, the output may be an angular value of the joint of the robotic arm, or a pose of the end tool of the robotic arm.

The memory 106 may include random access memory (RAM), read only memory (ROM), flash memory, or any other suitable memory systems. The memory 106 is configured to store a model of dynamics of the system 100. The dynamics of the system 100 represent an evaluation of the state of the system 100 over time. The system 100 includes uncertainty in its dynamics. The model of dynamics of the system 100 includes a known part of the dynamics of the system 100 and an unknown part of the dynamics of the system 100. Some embodiments are based on the realization that while the known part of the dynamics of the system 100 is a function of the state of the system 100 and the control input to the system 100, the unknown part of the dynamics of the system 100 can be represented as a function of only the state of the system, i.e., without parameterizing the function on the control input.

The unknown part of the dynamics of the system 100 may represent parts of the dynamics of the system 100 that are not modeled correctly. For example, the unknown part of the dynamics of the system 100 may represent external forces acting on the system 100 for a given period of time, while the external forces are explicitly included in the model of dynamics of the system 100. The external forces include, for instance, impulse forces acting on the system 100 due to contact dynamics with an external object. Alternatively or additionally, the unknown part of the dynamics of the system 100 may represent model mismatches due to errors in physical parameters of the system 100, e.g., a mass value discrepancy, or a friction value discrepancy.

Some embodiments are based on the realization that a compound control objective of a robust control of the system 100 can be separated into different control objectives. This allows creating different controllers devoted to a single or at least simplified control objective, such that total control of the system 100 is performed cooperatively by the individual controllers. For example, it is an object of some embodiments to provide a controller that (a) tracks the reference trajectory with a decaying bounded tracking error, despite the uncertainty; and (b) learns the uncertainty, while maintaining boundedness of the tracking error during the learning. Some embodiments are based on the recognition that such objectives can be implemented by different controllers cooperatively working together. According to an embodiment, the different controllers can be implemented by the control system 108.

The control system 108 includes a processor coupled with instructions executable by the processor. The instructions form modules of the control system 108 and may be stored in a memory associated with the control system 108, or the memory 106. The modules of the control system 108 are executed by the processor to implement the different controllers which collectively ensure tracking of the reference trajectory with a decaying bounded tracking error, despite the uncertainty in the dynamics of the system 100.

Figure 1B:
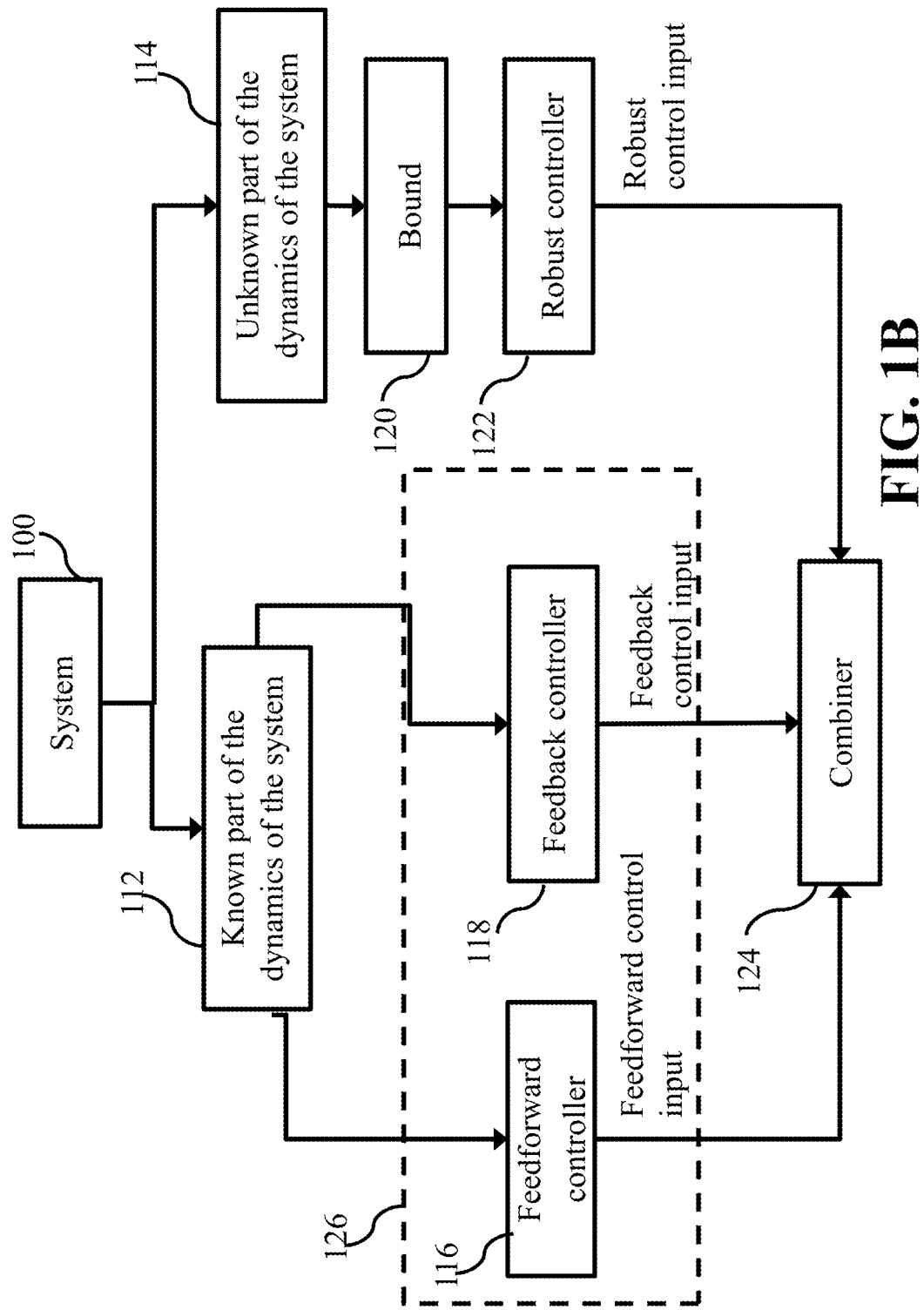
FIG. 1B shows a block diagram of different controllers implemented by a control system, according to some embodiments.

FIG. 1B shows a block diagram of the different controllers implemented by the control system 108, according to some embodiments. The modules of the control system 108 may include a feedforward controller 116, a feedback controller 118, a robust controller 122, and a combiner 124, which can be executed by the processor to implement the different controllers. The feedforward controller 116, the feedback controller 118, and the robust controller 112 are designed offline, i.e., in advance. Additionally, the modules of the control system 108 may include a trajectory generation module configured to generate the reference trajectory based on the known part of the dynamics of the system.

Some embodiments are based on realization that separation of a known part 112 of the dynamics of the system 100 and an unknown part 114 of the dynamics of the system 100 allows designing a tracking controller 126 with a consideration that the unknown part 114 does not exist. Such a design makes the tracking controller 126 independent of the unknown part 114 of the dynamics, which allows optimizing the tracking controller 126 for the known part 112 of the dynamics of the system 100. In an embodiment, the tracking controller 126 can be designed as a combination of the feedforward controller 116 and the feedback controller 118. The feedforward controller 116 is designed based on the known part 112 of the dynamics of the system 100. The feedforward controller 116 is configured to generate a feedforward control input causing the state of the system 100 to track the reference trajectory with a tracking error. The feedback controller 118 is designed based on the known part 112 of the dynamics of the system 100. In an embodiment, the feedback controller 118 is a linear controller. The feedback controller 118 is configured to generate a feedback control input causing the state of the system 100 to reduce the tracking error. The separation of the tracking controller 126 into the feedforward 116 and the feedback controller 118 allows use of different optimization techniques for different controllers and allows updating each controller differently and/or asynchronously.

However, ignoring the unknown part 114 of the dynamics can make the controlling of the system 100, based only on the known part 112 of the dynamics of the system 100, unstable. To that end, some embodiments employ the robust controller 122 whose objective is to stabilize the states of the system 100 along the reference trajectory, which in turn results in a stable control of the system 100. In an embodiment, the robust controller 122 is a nonlinear controller. As the robust controller 122 does not have to track the reference trajectory, design of the robust controller 122 is simplified. For example, the control system 108 is configured to determine a bound 120 on the unknown part 114 of the dynamics of the system 100. Further, the robust controller 122 is designed based on the bound 120. While the bound 120 is determined for the unknown part 114 of the dynamics of the system 100, the unknown part 114 itself is not considered directly in the design of the robust controller 122, which simplifies the design and update of the robust controller 122.

The robust controller 122 is configured to generate a robust control input that stabilizes the control of the system 100, where the unknown part 114 of the dynamics of the system 100 is within the bound 120. The combiner 124 is configured to generate the control input to the actuator 102 of the system 100 based on a combination of the feedforward control input, the feedback control input, and the robust control input. The actuator 102 changes the state of the system 100 based on the control input to perform the task according to the reference trajectory. To that end, the combination of the tracking controller 126 and the robust controller 122 constitutes a full controller that tracks the reference trajectory with the decaying bounded tracking error, despite the uncertainty in the dynamics of the system 100.

Some embodiments are based on recognition that, as the control of the system 100 is stable due to the different controllers (such as tracking controller 126 and the robust controller 122), it is safe to use various learning methods to recursively learn, in real time (during operation of the system), the unknown part 114 of the dynamics of the system 100. In other words, the full controller constituted from the different controllers allow safe learning of the unknown part 114 of the dynamics of the system 100, while maintaining boundedness of the tracking error during the learning.

To that end, a learning phase is augmented to the full controller. In particular, the control system 108 is provided with a learning module. The learning module may be executed by the processor to implement the safe learning of the unknown part 114 of the dynamics of the system 100.

Figure 1C:
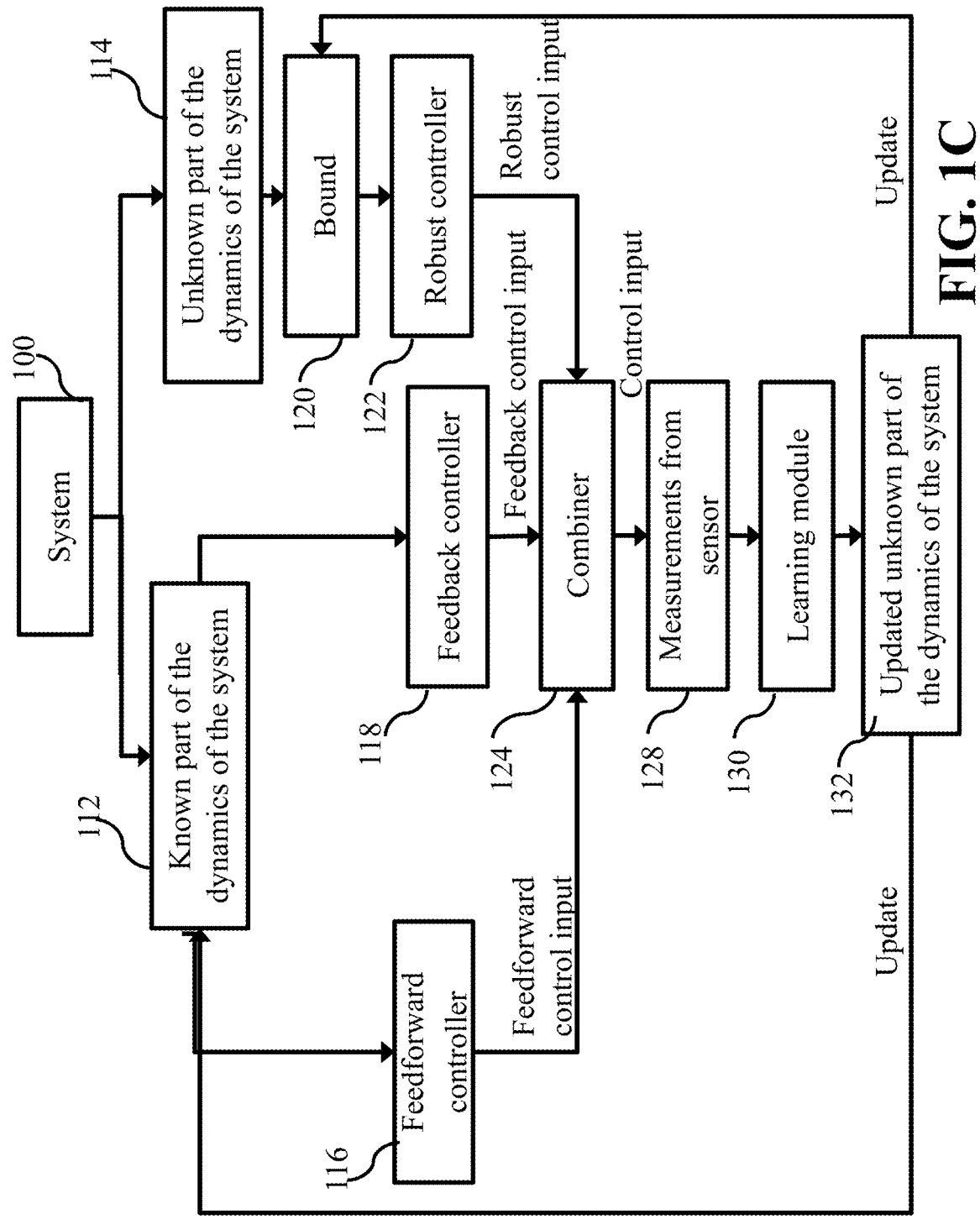
FIG. 1C shows a schematic for safe learning of an unknown part of dynamics of the system, using a learning module, according to some embodiments.

FIG. 1C shows a schematic for the safe learning of the unknown part 114 of the dynamics of the system 100, using a learning module 130, according to some embodiments. The actuator 102 changes the state of the system 100 based on the control input generated by the combiner 124. Subsequently, measurements from the sensor 104 including the states of the system 100 or the output of the system 100 corresponding to the control input are obtained. According to some embodiments, the unknown part 114 of the dynamics of the system 100 may be learned statistically from the corresponding pairs of control inputs and outputs of the system 100 (e.g., the measurements 128). Due to statistical nature of learning the unknown part 114 of the dynamics, the unknown part 114 of the dynamics of the system 100 is represented by parameters of a probabilistic distribution including a first-order moment and a second-order moment of the probabilistic distribution. In an embodiment, the probabilistic distribution is a Gaussian distribution, such that the first-order moment is a mean of the Gaussian distribution and the second-order moment is a variance of the Gaussian distribution.

The learning module 130 is configured to update the parameters of the probabilistic distribution of the unknown part 114 of the dynamics based on the corresponding pairs of control inputs and outputs of the system 100 to produce an updated unknown part 132 of the dynamics of the system 100.

The learning module 130 is further configured update the known part 112 of the dynamics based on a first-order moment of the updated probabilistic distribution of the updated unknown part 132 of the dynamics of the system 100. The learning module 130 is further configured to update the reference trajectory based on the updated known part of the dynamics of the system 100. The learning module 130 is further configured to update the feedforward controller 116 based on the updated reference trajectory and the updated known part of the dynamics of the system 100.

The learning module 130 is further configured to update the feedback controller 118 based on the updated known part of the dynamics of the system 100.

The learning module 130 is further configured to update the bound 120 based on a second-order moment of the updated probabilistic distribution of the updated unknown part 132 of the dynamics of the system 100. Subsequently, the learning module 130 updates the robust controller 122 based on the updated bound. The updated feedforward controller, the updated feedback controller, and the updated robust controller constitute an updated full controller. The updated full controller performs the task according to the reference trajectory in an efficient manner, e.g., tracks the reference trajectory accurately.

To that end, in each iteration of learning the unknown part 114 of the dynamics, based on the learning module 130, the unknown part 114 of the dynamics is updated and consequently the full controller is updated. Such learning iterations continue over time, leading to a constant improvement of the model of the dynamics of the system 100 and the full controller, which in turn leads to an accurate execution of the task by the system 100. The learning iterations are carried out until a termination condition is met. In an embodiment, the termination condition may be a number of the learning iterations. In such a manner, in the real time, the model of the dynamics of the system 100 is learned safely, i.e., without losing the stability of the system 100, while adapting the different controllers to the learned model of the dynamics of the system 100, specifically, the updated unknown part 114 of the dynamics.

Figure 2:
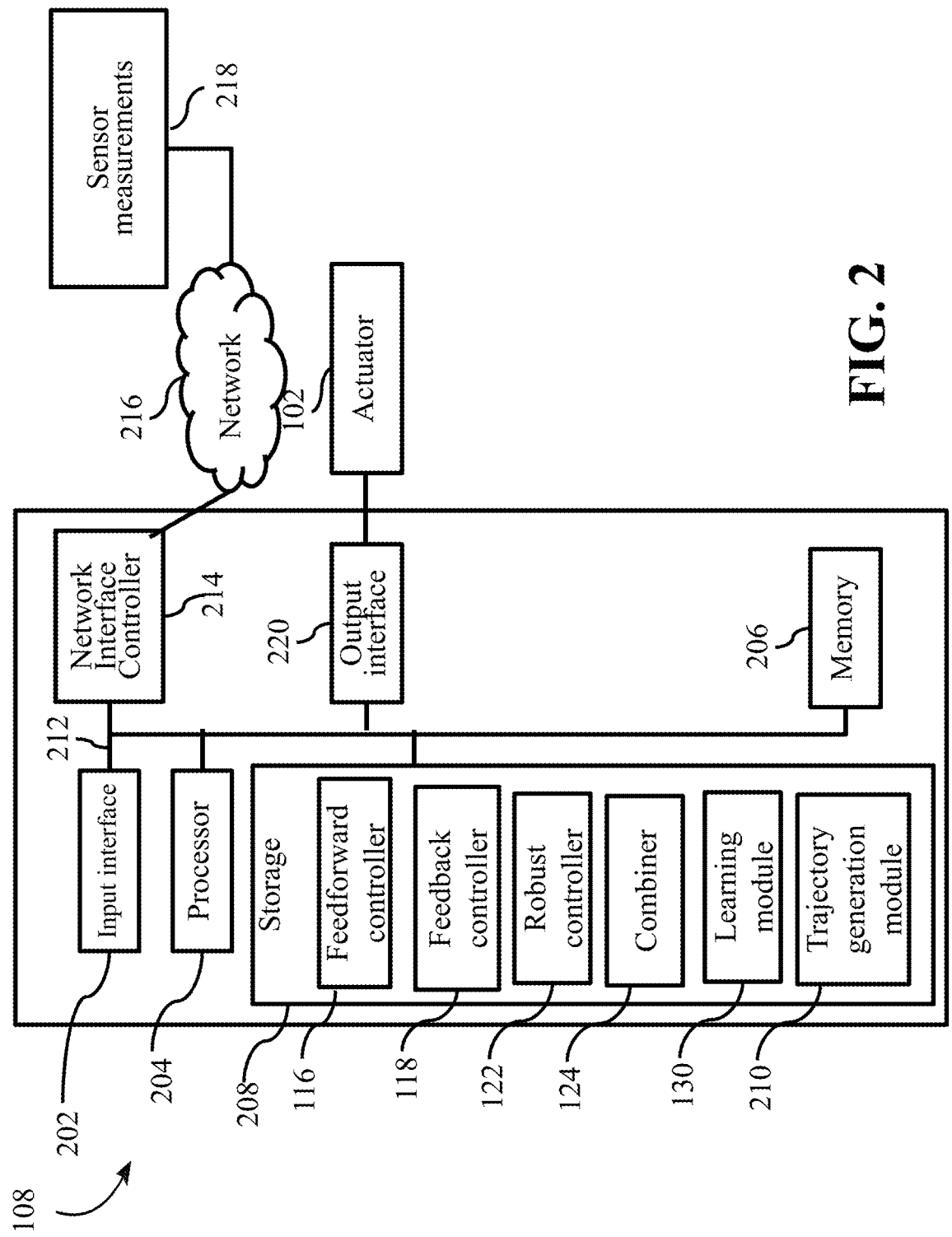
FIG. 2 shows a block diagram the control system, according to some embodiments.

FIG. 2 shows a block diagram the control system 108, according to some embodiments. The control system 108 is configured to recursively determine and submit the control input to the actuator 102 to change the state of the system 100.

The control system 108 can have a number of interfaces connecting the control system 108 with other systems and devices. For example, a network interface controller (NIC) 214 is adapted to connect the control system 108, through a bus 212, to a network 216. Through the network 216, either wirelessly or through wires, the control system 108 receives measurements 218 from the sensor 104 including the states of the system 100 or the output of the system 100 corresponding to the control input.

The control system 108 includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices. Further the control system 108 includes a storage device 208 adapted to store different modules including instructions executable by the processor 204. The storage device 208 can be implemented using a hard drive, an optical drive, a thumb drive, an array of drives, or any combinations thereof.

The storage device 208 is configured to store the feedforward controller 116, the feedback controller 118, the robust controller 122, the combiner 124, the learning module 130, and a trajectory generation module 210. The feedforward controller 116 is configured to generate the feedforward control input causing the state of the system 100 to track the reference trajectory with the tracking error. The feedback controller 118 is configured to generate the feedback control input causing the state of the system 100 to reduce the tracking error. The robust controller 122 is configured to generate the robust control input that stabilizes the control of the system 100 having the uncertainty in its dynamics limited by the bound. The combiner 124 is configured to generate the control input to the actuator 102 of the system 100 based on a combination of the feedforward control input, the feedback control input, and the robust control input.

The learning module 130 is configured to (1) update the parameters of the probabilistic distribution of the unknown part 114 of the dynamics based on corresponding pairs of control inputs and outputs of the system 100; (2) update the known part 112 of the dynamics based on the first-order moment of the updated probabilistic distribution; (3) update the feedback controller 118 based on the updated known part of the dynamics of the system; (4) update the bound 120 based on the second-order moment of the updated probabilistic distribution; and (5) update the robust controller 122 based on the updated bound.

Additionally, in some embodiments, the learning module 130 updates the bound 120 using one or a combination of an infinity norm bound of the updated probabilistic distribution, a one-norm bound of the updated probabilistic distribution, a 2-norm (or Euclidean norm) bound of the updated probabilistic distribution, and a Frobenius norm bound of the updated probabilistic distribution.

The trajectory generation module 210 is configured to generate the reference trajectory based on the known part of the dynamics of the system 100.

Additionally, the control system 108 may include an output interface 220. In some embodiments, the control system 108 is further configured to submit, via the output interface 220, the control input to the actuator 102 of the system 100.

Mathematical Implementation

Let $R_+^n$ to denote a set of vectors with non-negative elements in $R^n$, $\|\cdot\|$ denote Euclidean norm; i.e., for a vector $x \in R^n$, $\|x\| \triangleq \|x\|_2 = \sqrt{x^T x}$, where $x^T$ denotes a transpose of the vector x, and $\|x\|_Q^2 = x \cdot Q \cdot x^T$, $Q>0$, and $\dot{f}$ denote a time derivative of $f$.

Consider a nonlinear dynamical system (e.g., the system 100)

$$\dot{x} = f(x,u) + \hat{f}(x) \quad (1)$$

where, $x \in X \subset R^n$ and $u \in R^m$ represent state and input vectors, respectively. $\hat{f}$ represents the unknown part 114 of the dynamics. Smoothness of the vector fields f and $\hat{f}$, and local controllability of the system (1) is assumed. Further, the following boundedness assumption 1 is considered.

Assumption 1: The unknown uncertainty vector filed $\hat{f}$ is bounded by a non-negative continuous bounded function, i.e., $\exists \bar{f}: [0, \infty[ \to R^{n+}$, s.t. $\|\hat{f}\| \le \bar{f}(x)$, $\forall x \in X \subset R^n$.

Remark 1: Assumption 1 means that the uncertain part 114 of the dynamics $\hat{f}$ is unknown, however, it is bounded with a known function $\bar{f}$. This function can simply be set as a constant function in some applications, where one has no intuition on growth of the uncertainty as function of the state.

Control Objectives

It is an objective of some embodiments to design a controller (that corresponds to the full controller), which allows:

tracking of an optimal trajectory (also referred as the reference trajectory), i.e., $x_{opt}(t) \in X$, $\forall t \ge 0$, with a decaying bounded error, despite the unknown uncertainty $\hat{f}$; and iterative learning of the uncertainty $\hat{f}$, while maintaining boundedness of the tracking error during the learning.

Some embodiments are based on recognition that to design the controller that tracks the optimal trajectory with the decaying bounded error, despite the unknown uncertainty $\hat{f}$, the controller may be designed as a sum of three main terms: an optimal feedforward term for a nominal system, i.e., $\hat{f} \equiv 0$, a locally stabilizing linear state feedback for the nominal system, and a nonlinear robust state feedback control (e.g., the robust controller 122) for an actual system (including the uncertain term $\hat{f}$).

Optimal feedforward control: An optimal problem to generate open-loop feasible optimal trajectories for the nominal system is formulated. For example, some embodiments solve the following functional optimization problem $$\mathrm{Min}_{x,u} J(x,u)$$

$$\dot{x} = f(x,u),$$

$$x \in X, u \in \mathbb{R}^m, \quad (2)$$

where $J(.,.): X \times R^m \to R_+^n$, represents a performance positive definite cost function. Under the assumption that problem (2) is feasible, let $u_{op}$ and $x_{op}$ denote an open-loop optimal control and optimal state trajectory, respectively.

Remark 2: Choice of the performance cost function J is application dependent. Indeed, if a target of a considered application is to stabilize the state at a target state $x^*$ at a desired time $t^*$, starting from a desired state $x^0$, then J can be written as a positive function of a distance between the state value at $t^*$ and the desired value $x^*$. More explicitly, the following optimal problem can be solved $$\mathrm{Min}_{x,u} \frac{1}{2} \|x(t^*) - x^*\|_Q, \quad (3)$$

$$\dot{x} = f(x,u), x(0) = x^0 \in X,$$

$$x \in X, u \in \mathbb{R}^m.$$

Furthermore, in some embodiments, to penalize an amount of control used in open-loop, the cost function should be amended accordingly, for instance, by solving the following problem $$\mathrm{Min}_{x,u} \frac{1}{2} \|x(t^*) - x^*\|_Q + \frac{1}{2} \|u\|_P, \quad (4)$$

-continued $$\dot{x} = f(x, u), x(0) = x^0 \in X,$$
$$x \in X, u \in \mathbb{R}^m.$$

The optimal control problems (3) and (4) may be solved using one of a nonlinear programming or a pseudospectral method.

Local linear state feedback control: A local stabilizing controller (e.g., the feedback controller 118) is added to the optimal controller $u_{op}$. To achieve local stabilization of the tracking error, a tangent linearization of nominal dynamics along the optimal trajectories $x_{op}$ and $u_{op}$ is considered. For instance, if the tracking error is defined as $e=x-x_{op}$, then the tangent linearization of the error dynamics along $x_{op}$ and $u_{op}$ can be written as $$\dot{e} = A(t)e + B(t)u_{lin}, \tag{5}$$
$$A = \frac{\partial f}{\partial x}|_{x_{op}}, B = \frac{\partial f}{\partial u}|_{u_{op}},$$

where, $u_{lin} \in \mathbb{R}^m$ denotes the linear controller, and $e \in E = \{e \in \mathbb{R}^n, \text{ s.t. } x = e + x_{op} \in X \subset \mathbb{R}^n\}$.

To stabilize the state constrained time-varying system (5) to origin, the feedback controller 118 is used to ensure asymptotic stabilization, while satisfying state constraints, i.e., set positive invariance results. The feedback controller 118 may be designed by the learning module 130, based on the updated known part of the dynamics of the system, using one or a combination of a linear quadratic control (LQR), a linear Gaussian control (LQG), a Lyapunov design control, an optimal control, a linear matrix inequality (LMI)-based design, a quantitative feedback theory (QFT)-based design.

In the present disclosure, for purpose of explanation, the feedback controller 118 is designed based on the Lyapunov-based control. For instance, the following Lyapunov function is selected $$V(t,e) = e^T P(t) e, \tag{6}$$

where, P is assumed to be continuously differentiable, symmetric, positive definite, and bounded, i.e., $\exists c_1 > 0, c_2 > 0$, s.t., $0 < c_1 I \leq P(t) \leq c_2 I, \forall t \geq 0$.

Then, the Lyapunov equation satisfies $$c_1 \|e\|^2 \leq (t,e) \leq c_2 \|e\|^2, \tag{7}$$

Furthermore, if a linear state feedback is selected as $$u_{lin}(t,e) = K(t)e, \tag{8}$$

then $$\dot{V}(t,e) e^T \dot{P}(t) e + e^T (P\tilde{A} + \tilde{A}^T P) e$$

where, $\tilde{A} = A + BK$. If the following time-varying Riccati equation is satisfied $$\dot{P}(t) + P\tilde{A} + \tilde{A}^T P = -Q(t), \tag{9}$$

where, Q(t) is continuous, symmetric, positive definite, and bounded, i.e., $\exists c_3 > 0$, s.t., $Q(t) \geq c_3 I, \forall t \geq 0$. $u_{lin}$ given by (8) corresponds to the feedback controller 118.

Finally, the bound may be given as $$\dot{V}(t,e) = e^T (\dot{P} + P\tilde{A} + \tilde{A}^T P) e = -e^T Q e \leq -c_3 \|e\|^2. \tag{10}$$

Using classical results from nonlinear Lyapunov theory, based on (7) and (10), the local uniform exponential stability of the error dynamics (5), under the control $u_{lin}$, can be concluded.

Nonlinear robustifying state feedback control: Here, an effect of the uncertainty $\hat{f}$ on the error dynamics stability is considered. If the uncertain model (1) is considered with non-zero $\hat{f}$, then the error dynamics may be given as $$\dot{e} = A(t)e + B(t)u + \hat{f}(e,t), \tag{11}$$

where, A and B are given by the same definitions as in (5). In this case, a controller which compensates for the uncertainty defined under Assumption 1 need to be designed.

Different techniques are used to augment the nominal controller with a robustifying term. For example, a new controller can be written as $u(t, e) = u_{nom}(t, e) + u_{rob}(t, e)$. The $u_{rob}$ corresponds to the robust controller 122.

The learning module 130 is configured to design the robust controller $u_{rob}$ based on the updated bound using one or a combination of a Lyapunov re-design controller, a robust Lyapunov function-based controller, a semidefinite programming (SDP)-based controller, a sum of squares (SOS)-based controller, a passivity theory-based controller. In the present disclosure, for purpose of explanation, Lyapunov reconstruction techniques are used for designing the robust controller $u_{rob}$. For example, to design the robust controller $u_{rob}$, some embodiments evaluate the Lyapunov function (6) evolution along the new error dynamics (11). In this case, $$\dot{V}(t, e) = e^T \dot{P}(t) e + e^T (P\tilde{A} + \tilde{A}^T P) e + 2e^T (Bu_{rob} + \hat{f}), \tag{12}$$
$$\leq 2e^T (Bu_{rob} + \hat{f}),$$
$$\leq 2e^T PBu_{rob} + 2\|e^T P\| \bar{f}(t, e),$$

Accordingly, the following robust controller may be selected $$u_{rob}(t,e) = k \text{ sign}(e^T P) B^T (BB^T)^{-1} \bar{f}(t,e), k < -1, \tag{13}$$

this in turn leads to a bound $$\dot{V}(t, e) \leq 2e^T PB(k \text{ sign}(e^T P) B^T (BB^T)^{-1} \bar{f}(t, e)) + 2\|e^T P\| \bar{f}(t, e), \tag{14}$$
$$\leq 2\|e^T P\|(k+1)\bar{f}(t, e) < 0.$$

Equation (14), together with the boundedness of P and $\bar{f}$, allows preserving local uniform exponential stability.

Remark 3: (Invariance of the set E) If it is started in the state constraints set E, i.e., $e(0) \in E$, an upper-bound on $\|e\|$ can be found, s.t., $e(0)^T P(0) e(0) \leq c_2 \|e\|$, next, since it is shown that V is decreasing under the controller $u_{lin} + u_{rob}$, the bounds can be written as $c_1 \|e(t)\| \leq e(t)^T P(t) e(t) \leq e(0)^T P(0) e(0) \leq c_2 \|e\|$, which leads to the bound $$\|e(t)\| \leq \frac{c_2}{c_1} \|\bar{e}\|.$$

For the sake of clarity, a final controller is summarized in the following theorem.

Theorem 1: Consider the nonlinear uncertain system (1), where $\hat{f}$ satisfies assumption 1, then under the time-varying feedback $u = u_{op}(t) + u_{lin}(t, e) + u_{rob}(t, e)$, where $e = x - x_{op}$, $x_{op}$ and $u_{op}$ are open-loop solutions of (2), % in is given by (8), (9), and $U_{rob}$ is given by (13), the closed loop error dynamics (11) are locally uniformly exponentially stable. Furthermore, if an initial condition satisfies the constraint $x(0) \in X$, then x remains in the positive invariant set X To that end, a controller that ensures bounded tracking error for uncertainty term $\hat{f}$ is designed.

Learning and Iterative Performance Improvement

Figure 3A:
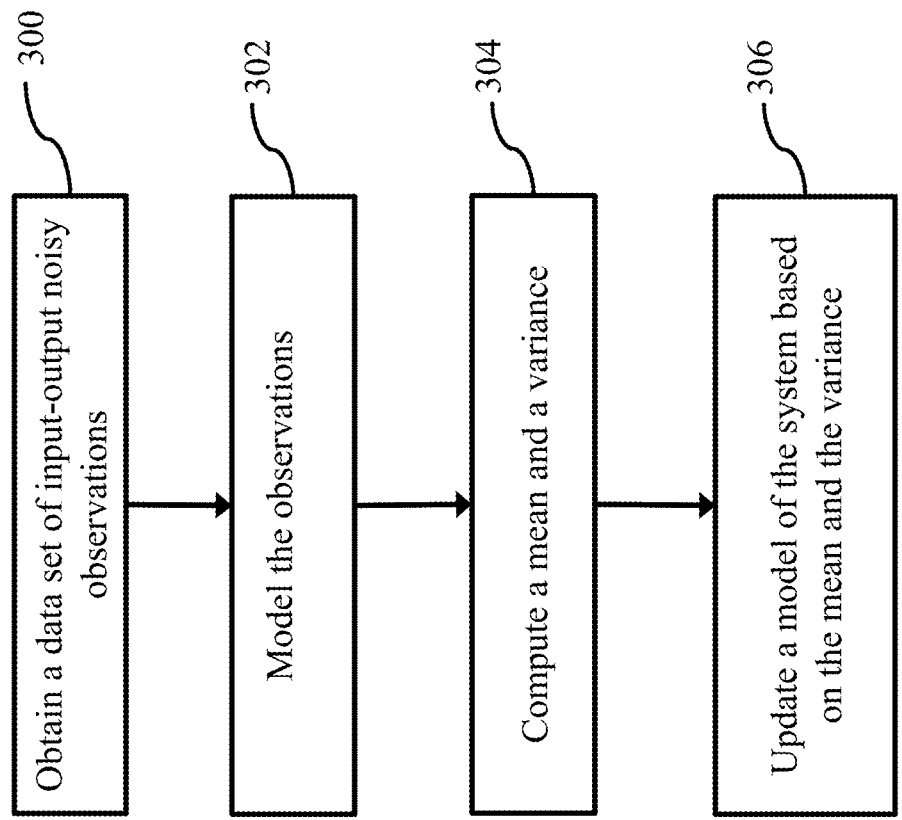
FIG. 3A shows a schematic for modelling, based on a Gaussian process, the unknown part of the dynamics of the system, according to some embodiments.

As the controller that ensures tracking error for uncertainty term $\hat{f}$ is designed, the controller can be augmented with a learning phase which is designed to improve the controller performance. The learning module 130 is configured to update the parameters of the probabilistic distribution of the unknown part $\hat{f}$ of the dynamics using a data-driven and model-free method including one or a combination of a Gaussian process, a reinforcement learning, a machine learning, or a deep neural network. In the present disclosure, for ease of explanation, the Gaussian process is selected for modelling the uncertain part $\hat{f}$ and updating the probabilistic distribution of the unknown part $\hat{f}$ FIG. 3A shows a schematic for modelling the uncertain part $\hat{f}$ based on the Gaussian process, according to some embodiments. The uncertain part $\hat{f}$ is modeled offline, i.e., in advance, by Gaussian process (GP), and given by $$\hat{f}^l = \hat{f}_{ave}{}^l + \hat{f}_{var}{}^l, \quad l=1,2, \quad (15)$$

where, l denotes the learning iterations, $\hat{f}_{ave}$ denotes a deterministic posterior of a Gaussian model, and $\hat{f}_{var}$ denotes a bounded variance of the Gaussian model.

At block 300, a data set of input-output noisy observations, $\{X, y^i\}$, is obtained. Components of $\vec{f}(x_k)$, denoted by $\hat{f}_i(x_k)$, with i=1 ... $n_s$, are inferred and updated based on the data set of input-output noisy observations. The data set is collected using a closed-loop controller. Let N be a number of training samples available, and define a set of GPR inputs as $X=[x_1, \ldots, x_N]$ $x_k \in R^{n_s}$. The output $y^i = [y^i, \ldots, y_N{}^i]$ represents residual dynamics between a known model f and real dynamics of the system $f_{real}$. Thus, $y_N{}^i = f_{real}(x_k, u_k) - f(x_k, u_k)$.

At block 302, the GPR models the observations as $$y^i = [f^i(x_1), \ldots, f^i(x_N)]^T + [e_1, \ldots, e_N]^T \quad (16)$$
$$= f^i(X) + e,$$

where e is Gaussian i.i.d. noise with zero mean and covariance $\sigma_n^2$, and $f^i(X) \sim N(m_{f^i}(X), K_{f^i}(X, X))$. The matrix $K_{f^i}(X, X) \in R^{N \times N}$ is called a kernel matrix, and is defined through a kernel function $k_{f^i}(\bullet, \bullet)$, i.e., the $K(X,X)$ entry in position k,j is equal to $k(\overline{x}_k, \overline{x}_j)$. At block 304, a mean $\hat{f}_{mean}$ and a variance $\hat{f}_{var}$ of the Gaussian distribution/model is computed. In GPR, a crucial aspect is selection of a prior functions for $f^i(\bullet)$, defined by $m_{f^i}(\bullet)$, usually considered 0, and $k_{f^i}(\bullet, \bullet)$. Then, the maximum a posteriori estimator is:

$$\hat{f}^i(\bullet) = K_{f^i}(\bullet, X)(K_{f^i}(X,X) + \sigma_n^2 I_N)^{-1} y^i, \quad (17)$$

According to an embodiment, the equation (17) is a mean prediction, $\hat{f}_{mean}{}^i$ obtained from trained GPR model. Similarly, a variance, $\hat{f}_{var}$, of the estimated model can be obtained. Further, a vector valued estimated function is represented as $\hat{f}_{mean}$, and the variance as $\hat{f}_{var}$. $\hat{f}_{mean}$ and $\hat{f}_{var}$ correspond to the first-order moment and the second-order moment, respectively. A standard deviation of the estimated function $\hat{f}^i$ is given by $\sqrt{\hat{f}_{var}{}^i}$ At block 306, the model (1) is updated based on the mean $\hat{f}_{mean}$ and the variance $\hat{f}_{var}$ to incorporate the Gaussian process estimation in the full controller. The model (1) is updated as $$f^j = f^{j-1} + \hat{f}_{mean}{}^j$$

$$\tilde{f}^j = \hat{f}_{var}, \quad (18)$$

where, j=1, 2, ..., and $f^0 = f$. In other words, the known part of the dynamics is updated recursively by combining the known part determined for a previous iteration with the mean $\hat{f}_{mean}$ of the Gaussian distribution updated during a current iteration. Further, the unknown part of the dynamics is updated recursively by replacing the unknown for a previous iteration with the variance $\hat{f}_{var}$, of the Gaussian distribution updated during a current iteration.

Additionally, in some embodiments, the updated vector fields are used to update the controller obtained by (2), (8), (9), and (13) at each learning iteration j. The variance of the learned GP model is used to provide the uncertainty bound in the model of the system by computing the standard deviation of each state element. It is noted that for j≥2, $u_{op}$ is not updated, and thus the trajectory optimization is solved only once j=1.

FIG. 3B shows a learning-based control algorithm for updating the uncertain part $\hat{f}$, according to some embodiments. In an embodiment, the learning-based control algorithm incorporated as a part of the learning module 130. The control system 108 is configured to initialize an iteration, e.g., I=1 and apply the full controller obtained by (2), (8), (9), and (13). Further the control system 108 executes a loop. The loop includes evaluating the GP uncertainty approximation by the control system 108. If the GP estimation converges, then execution of the loop is terminated. If GP estimation does not converge, a next iteration I=I+1 is initialized to improve the GP uncertainty approximation. Further, the control system 108 resets $t \in [(I-1)t^*, t^*]$, $x((I-1)t^*) = x_0$, and applies the full controller obtained by (2), (8), (9), and (13). Subsequently, the control system 108 executes the loop.

Remark 4: (Boundedness of the error over the learning iterations) Since it is proven in Theorem 1 that the full controller obtained by (2), (8), (9), and (13), ensures boundedness of the tracking error, then we can affirm that at each iteration, under the assumption of boundedness of the Gaussian process approximation variance, that the tracking error will remain bounded and exponentially converge to zero. Furthermore, using results from switching systems analysis, more specifically using the stability results of switching between stable dynamics without repetition, it can be concluded that the tracking error will remain bounded and eventually converges exponentially to zero, over all the learning iteration.

FIG. 4 illustrates the system 100 performing a task based on a reference trajectory 408, according to some embodiments. Here, the system 100 is a robot. The robot includes a robotic arm 402 that is configured to perform the task. The task includes picking of an object 404 of a certain shape, while maneuvering between obstacles 406a and 406b. A model of the object 404, or the obstacles 406a and 406b, or the robotic arm 402 may not be known, and due to aging and faults, the model of the robot may be uncertain (in other words, uncertainty exists in dynamics of the robot arm 402).

The robot (i.e., the system 100) includes the control system 108. The control system 108 provides the full controller that controls the robotic arm 402 to track of the trajectory 408, with a decaying bounded error, despite the uncertainty in the dynamics of the robot arm 402. While controlling the robotic arm 402, the control system 108 learns uncertainty in the dynamics of the robotic arm 402 without losing a stability of the robot. Additionally, based on the learned uncertainty in the dynamics of the robot arm 402, the full controller may be updated. Since the updated full controller is based on the learned uncertainty, the updated full controller may control the robotic arm 402 to perform the task according to the reference trajectory 408 in an efficient manner, e.g., tracks the reference trajectory accurately. As a result, the robot ensures not to hit the obstacles 406a and 406b while picking up the object 404, regardless of the uncertainty in the dynamics of the robotic arm 402.

Figure 5A:
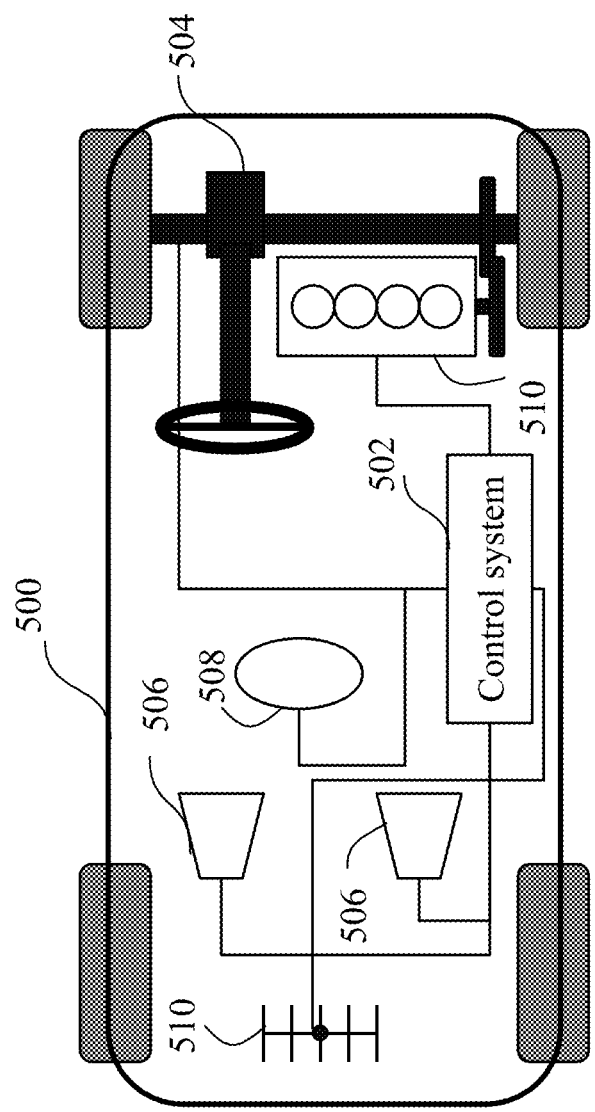
FIG. 5A shows a schematic of a vehicle integrated with a control system, according to some embodiments.

FIG. 5A shows a schematic of a vehicle 500 integrated with a control system 502 according to some embodiments. The vehicle 500 may be any type of wheeled vehicle, such as a passenger car, bus, or rover. Also, the vehicle 500 can be an autonomous or semi-autonomous vehicle. For example, some embodiments control motion of the vehicle 500. Examples of the motion include lateral motion of the vehicle 500 controlled by a steering system 504 of the vehicle 500. In one embodiment, the steering system 504 is controlled by the control system 502. Additionally or alternatively, the steering system 504 may be controlled by a driver of the vehicle 500.

In some embodiments, the vehicle 500 may include an engine 510, which can be controlled by the control system 502 or by other components of the vehicle 500. The control system 502 may correspond to the control system 108. In some embodiments, the vehicle 500 may include an electric motor in place of the engine 510 and can be controlled by the control system 502 or by other components of the vehicle 500. The vehicle 500 can also include one or more sensors 506 to sense the surrounding environment. Examples of the sensors 506 include distance range finders, such as radars. In some embodiments, the vehicle 500 includes one or more sensors 508 to sense its current motion parameters and internal status. Examples of the one or more sensors 508 include global positioning system (GPS), accelerometers, inertial measurement units, gyroscopes, shaft rotational sensors, torque sensors, deflection sensors, pressure sensor, and flow sensors. The sensors provide information to the control system 502. The vehicle 500 may be equipped with a transceiver 510 enabling communication capabilities of the control system 502.

Figure 5B:
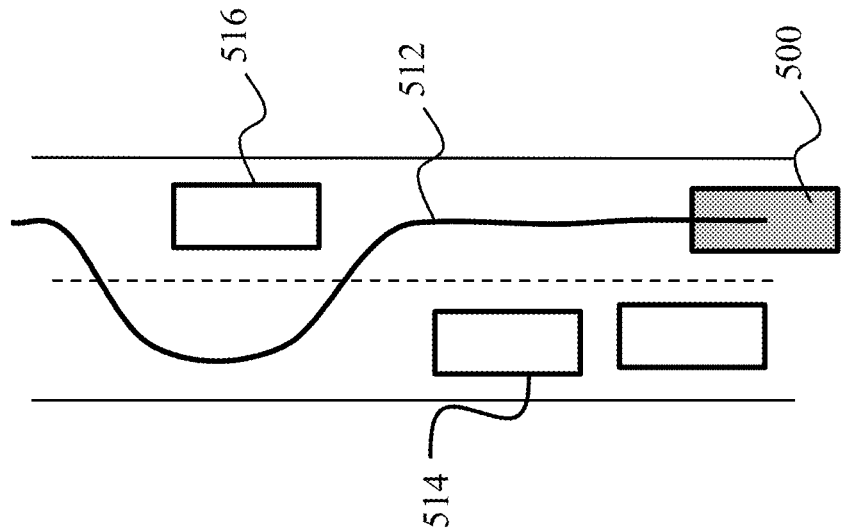
FIG. 5B shows the vehicle navigating according to a trajectory, for which control inputs are generated by using some embodiments.

FIG. 5B shows the vehicle 500 navigating according to a trajectory 512, for which control inputs are generated by using some embodiments. The control system 502 controls the vehicle 500 to track the trajectory 512 for navigating without colliding with other uncontrolled vehicles 514 and 516. For such controlling, the control system 502 determines and submits the control inputs to actuators of the vehicle 500. The control system 502 generates the control inputs, as described in the FIGS. 1A to 1C. In some embodiments, the control inputs include commands specifying values of one or combination of a steering angle of wheels of the vehicle 500, a rotational velocity of the wheels, and an acceleration of the vehicle 500. Additionally or alternatively, in some embodiments, the control inputs may be submitted to controllers associated with the actuators of the vehicle 500.

Figure 5C:
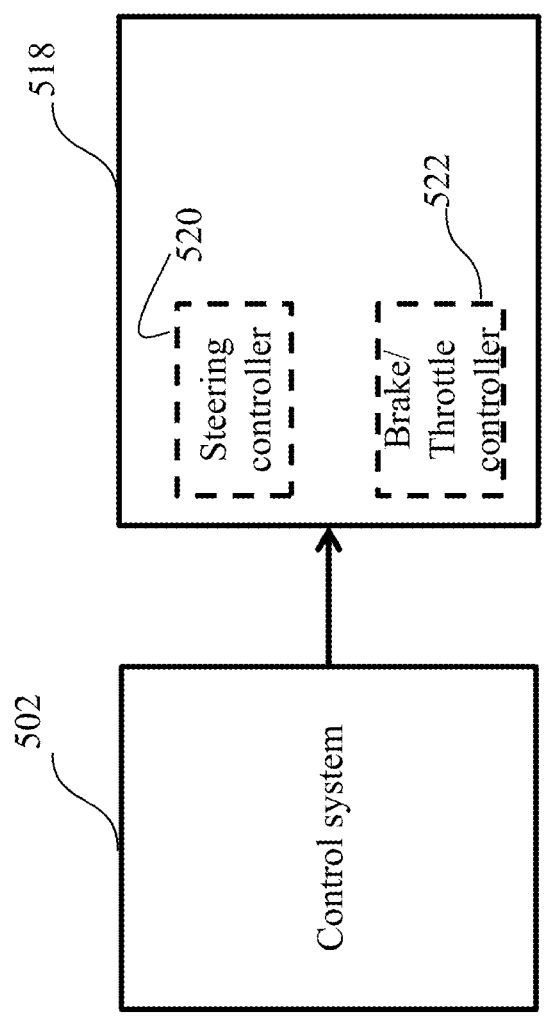
FIG. 5C shows a schematic of interaction between the control system and controllers associated with the actuators of the vehicle, according to some embodiments.

FIG. 5C shows a schematic of interaction between the control system 502 and the controllers 518 associated with the actuators of the vehicle 500, according to some embodiments. For example, the controllers 518 include a steering controller 520 associated with a steering wheel of the vehicle 500, and a brake/throttle controller 522 associated with a brake of the vehicle 500. The steering controller 520 and the brake/throttle controller 522 may control rotation and acceleration of the vehicle 500, respectively, based on the control inputs determined by the control system 502, so that the vehicle 500 tracks the trajectory 512.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A system for performing a task according to a reference trajectory, comprising:
at least one actuator configured to change a state of the system according to a control input;
at least one sensor configured to measure an output of the system caused by the control input;
a memory configured to store a model of dynamics of the system including a known part of the dynamics of the system as a function of the state of the system and the control input to the system and an unknown part of the dynamics of the system as a function of the state of the system, wherein the unknown part of the dynamics of the system is represented by parameters of a probabilistic distribution including a first-order moment and a second-order moment of the probabilistic distribution; and
a control system configured to recursively determine and submit the control input to the actuator to change the state of the system, the control system includes a processor coupled with stored instructions forming modules of the control system executed by the processor, the modules comprising:
a feedforward controller designed based on the known part of the dynamics of the system to generate a feedforward control input causing the state of the system to track the reference trajectory with a tracking error;
a feedback controller designed based on the known part of the dynamics of the system to generate a feedback control input causing the state of the system to reduce the tracking error;
a robust controller designed based on a bound on uncertainty of the unknown part of the dynamics of the system to generate a robust control input stabilizing control of the system having the uncertainty in its dynamics limited by the bound;
a combiner configured to generate the control input to the actuator of the system based on a combination of the feedforward control input, the feedback control input, and the robust control input; and
a learning module configured to:
update the parameters of the probabilistic distribution of the unknown part of the dynamics based on corresponding pairs of control inputs and outputs of the system;
update the known part of the dynamics based on a first-order moment of the updated probabilistic distribution;
update the feedback controller based on the updated known part of the dynamics of the system;
update the bound based on a second-order moment of the updated probabilistic distribution; and
update the robust controller based on the updated bound.

2. The system of claim 1, wherein the learning module further is configured to update the feedforward controller based on the updated known part of the dynamics of the system.

3. The system of claim 1, wherein the task performed by the system includes changing a state of the system from a start state to an end state, and wherein the control system further comprising:
a trajectory generation module configured to generate the reference trajectory based on the known part of the dynamics of the system.

4. The system of claim 3, wherein the learning module is further configured to: update the reference trajectory based on the updated known part of the dynamics of the system; and update the feedforward controller based on the updated reference trajectory and the updated known part of the dynamics of the system.

5. The system of claim 1, wherein the learning module is further configured to update the parameters of the probabilistic distribution of the unknown part of the dynamics using a data-driven and model-free method including one or a combination of a Gaussian process, a reinforcement learning, and a deep neural network.

6. The system of claim 1, wherein the learning module is further configured to update the bound using one or a combination of an infinity norm bound of the updated probabilistic distribution, a one-norm bound of the updated probabilistic distribution, a 2-norm bound of the updated probabilistic distribution, and a Frobenius norm bound of the updated probabilistic distribution.

7. The system of claim 1, wherein the feedback controller is a linear controller and the learning module is further configured to design the feedback controller based on the updated known part of the dynamics of the system using one or a combination of a linear quadratic control (LQR), a linear Gaussian control (LQG), a Lyapunov design control, an optimal control, a linear matrix inequality (LMI)-based design, a quantitative feedback theory (QFT)-based design.

8. The system of claim 1, wherein the robust controller is a nonlinear controller and the learning module is further configured to design the robust controller based on the updated bound using one or a combination of a Lyapunov re-design controller, a robust Lyapunov function-based controller, a semidefinite programming (SDP)-based controller, a sum of squares (SOS)-based controller, a passivity theory-based controller.

9. The system of claim 1, wherein the probabilistic distribution is a Gaussian distribution, such that the first-order moment is a mean of the Gaussian distribution and the second-order moment is a variance of the Gaussian distribution.

10. The system of claim 9, wherein the learning module is further configured to recursively update the known part of the dynamics of the system by combining the known part determine for a previous iteration with the mean of the Gaussian distribution updated during a current iteration.

11. The system of claim 9, wherein the learning module is further configured to recursively update the unknown part of the dynamics of the system by replacing the unknown for a previous iteration with the variance of the Gaussian distribution updated during a current iteration.

* * * * *